United States Patent
Holland et al.

(10) Patent No.: US 7,622,406 B2
(45) Date of Patent: Nov. 24, 2009

(54) PUNCTURE AND ABRASION RESISTANT, AIR AND WATER IMPERVIOUS LAMINATED FABRIC

(75) Inventors: John E. Holland, Bailey, NC (US); Connie W. Holland, Bailey, NC (US)

(73) Assignee: JHRG, LLC, Spring Hope, NC (US)

( * ) Notice: Subject to any disclaimer, the term of this patent is extended or adjusted under 35 U.S.C. 154(b) by 14 days.

(21) Appl. No.: 11/590,366

(22) Filed: Oct. 31, 2006

(65) Prior Publication Data
US 2008/0102721 A1    May 1, 2008

(51) Int. Cl.
*B32B 27/12* (2006.01)
*B32B 27/32* (2006.01)

(52) U.S. Cl. .................. 442/286; 442/290

(58) Field of Classification Search .......... 442/181, 442/236, 286, 290
See application file for complete search history.

(56) References Cited

U.S. PATENT DOCUMENTS

| | | | |
|---|---|---|---|
| 3,558,423 A | 1/1971 | Rossetti | |
| 3,657,042 A | 4/1972 | Rerolle et al. | |
| 3,723,234 A | 3/1973 | MacDonald | |
| 4,413,110 A | 11/1983 | Kavesh et al. | |
| 4,424,253 A | 1/1984 | Anderson | |
| 4,597,818 A | 7/1986 | Aoyama et al. | |
| 4,863,779 A | 9/1989 | Daponte | |
| 4,876,774 A | 10/1989 | Kavesh et al. | |
| 4,894,281 A | 1/1990 | Yagi et al. | |
| 4,957,804 A | 9/1990 | Hendrix et al. | |
| 4,983,433 A | 1/1991 | Shirasaki | |
| 4,983,449 A | 1/1991 | Nee | |
| 5,082,721 A | 1/1992 | Smith et al. | |
| 5,160,472 A | 11/1992 | Zachariades | |
| 5,160,767 A | 11/1992 | Genske | |
| 5,169,697 A | 12/1992 | Langley et al. | |
| 5,248,364 A | 9/1993 | Liu et al. | |
| 5,261,536 A | 11/1993 | Wilson | |
| 5,266,390 A | 11/1993 | Garland | |
| 5,284,540 A | 2/1994 | Roth et al. | |
| 5,286,576 A | 2/1994 | Srail et al. | |
| 5,389,448 A | 2/1995 | Schirmer et al. | |
| 5,401,344 A | 3/1995 | Dickson et al. | |

(Continued)

FOREIGN PATENT DOCUMENTS

DE    4441842 A1    6/1995

(Continued)

*Primary Examiner*—Lynda Salvatore
(74) *Attorney, Agent, or Firm*—Womble Carlyle Sandridge & Rice, PLLC; C. Roberts Rhodes

(57) ABSTRACT

A puncture and abrasion resistant, air and water impervious laminated fabric is provided. The laminated fabric includes a woven fabric base layer having warp and weft yarns, with at least 50 percent of the fibers in the warp yarns being formed of high performance material. A first thermoplastic film is bonded by heat and pressure to at least one of the sides of the fabric base layer. The first thermoplastic film is formed of ethylene vinyl acetate. A second thermoplastic film is bonded by heat and pressure to the first thermoplastic film on at least one of sides of the fabric. The second thermoplastic film is formed from either high density polyethylene or low density polyethylene.

3 Claims, 3 Drawing Sheets

U.S. PATENT DOCUMENTS

| | | |
|---|---|---|
| 5,431,284 A | 7/1995 | Wilson |
| 5,443,874 A | 8/1995 | Tachi et al. |
| 5,445,883 A | 8/1995 | Kobayashi et al. |
| 5,460,884 A | 10/1995 | Kobylivker et al. |
| 5,547,536 A | 8/1996 | Park |
| 5,567,498 A | 10/1996 | McCarter et al. |
| 5,578,373 A | 11/1996 | Kobayashi et al. |
| 5,677,029 A | 10/1997 | Prevorsek et al. |
| 5,789,327 A | 8/1998 | Rousseau |
| 5,958,805 A | 9/1999 | Quinones |
| 6,280,546 B1 | 8/2001 | Holland et al. |
| 6,818,091 B1 * | 11/2004 | Holland et al. ............ 156/309.6 |
| 2004/0105994 A1 * | 6/2004 | Lu et al. ..................... 428/515 |

FOREIGN PATENT DOCUMENTS

JP   0088072   8/1978

\* cited by examiner

PUNCTURE AND ABRASION RESISTANT, AIR AND WATER IMPERVIOUS LAMINATED FABRIC

FIELD OF THE INVENTION

The present invention relates to puncture and abrasion resistant laminates and the process for their production. More particularly, the present invention relates to a laminated high strength, high performance fabric made air and water impervious with multiple layers of thermoplastic film comprising ethylene vinyl acetate (EVA) and polyethylene.

BACKGROUND OF THE INVENTION

High performance fabrics have been used for numerous applications where tear-resistance, abrasion-resistance, cut- and stab-resistance, and chemical- and cold-resistance are important. As used herein, the term "high performance" refers to fabrics constructed from a group of fibers used to make cut-resistant and abrasion resistant articles such as cable and rope covers, hovercraft curtains, gun and boat covers, gloves, and aprons. The high strength-to-weight ratios of these fabrics can provide properties having significant improvements in the performance characteristics stated above at a fraction of the weight of other alternatives.

It has been found desirable to combine the advantages of high performance fabrics with thermoplastic film laminates for applications where the fabric also must be air and water impervious. Fabrics for such applications were previously typically constructed from vinyl-coated nylon or similar materials which do not exhibit high performance characteristics.

Recently, a thermoplastic film such as EVA has been bonded to a substrate of high performance fabric to create a more durable, cut and wear resistant flexible laminate that is also air and water impermeable. This high performance fabric is preferably constructed from an extended chain polyethylene such as ultra high molecular weight polyethylene. EVA provides a superior bond to the ultra high molecular weight polyethylene fabric; however, it has been found by the inventors that an EVA laminate becomes soft and tacky when exposed to temperatures above about 120 degrees Fahrenheit. As used herein, "tacky" refers to the property of a material wherein it is sticky and lacks a smooth, slick surface over which objects may slide with minimal friction. As will be appreciated by those skilled in the materials arts, when a film becomes soft and tacky, it is not only susceptible to degradation, but also to damage caused by objects that may impinge or otherwise impact the film. For example, a film subject to such degradation would prove highly unsuitable in warm or hot environments that are subject to severe weather such as tropical storms or hurricanes. Further, the tacky condition will degrade any operation in which objects must move over or make contact with the film; e.g., a conveyor belt. While it has been found that both low and high density polyethylene may be subjected to such elevated temperatures without becoming soft or tacky, the inventors have also found that polyethylene does not provide the degree of bonding to certain high performance fabrics, such as high molecular weight polyethylene fabrics, needed for certain applications. Thus, each of the two types of thermoplastic film provides at least one superior physical property over the other.

The inventors therefore have discovered a need then for a process that securely and reliably bonds a thermoplastic film to a high molecular weight polyethylene fabric and that has an outer film surface that will not degrade, become tacky, or soft under anticipated operational conditions.

SUMMARY OF THE INVENTION

The present invention solves the problems previously attendant to the lamination of fabrics constructed with a substantial percentage of high performance fibers such as high tenacity, high modulus, ultrahigh molecular weight polyethylene fibers. In general, the invention involves a laminate having a combination of films (EVA and polyethylene) on one or both sides of a base layer of high performance fabric, such as ultra-high molecular weight polyethylene.

The puncture and abrasion resistant, air and water impervious laminated fabric may be made through the application of pressure in a hydraulic press. An inner layer of EVA thermoplastic film is laminated directly to a fabric comprised of ultra high molecular weigh polyethylene yarn. An outer layer of polyethylene thermoplastic film is simultaneously bonded to the EVA layer. The laminating step is conducted at a temperature of between about 200 degrees Fahrenheit and 285 degrees Fahrenheit with a contact time of between about 5 minutes and about 15 minutes and at a laminating pressure of between about 50 psi and 500 psi. The same process can be used on a fabric having EVA and polyethylene film on both sides.

A second solution, and aspect of the present invention, involves rolling a fabric formed of ultra high molecular weight polyethylene yarns, a first layer of EVA thermoplastic film, and a second layer of polyethylene thermoplastic film together under tension to form a wound bundle with the fabric of high performance yarns placed on the outside. The wound bundle is then heated at a temperature of between about 200 degrees Fahrenheit and 285 degrees Fahrenheit and for a sufficient length of time of between about 8 hours and 18 hours. This softens both the EVA and the polyethylene films such that as the high performance fibers shrink, the fabric, EVA, and polyethylene will laminate and bond together, and such that the EVA will bond to the fabric, to create a three layer laminated construction.

Both of these techniques result in a flexible, puncture and abrasion resistant, substantially air and liquid impervious laminate that holds up well at elevated temperatures.

These and other aspects of the present invention will become apparent to those skilled in the art after a reading of the following description of the preferred embodiments when considered in conjunction with the drawings.

DETAILED DESCRIPTION OF THE PREFERRED EMBODIMENTS

Figure 1:
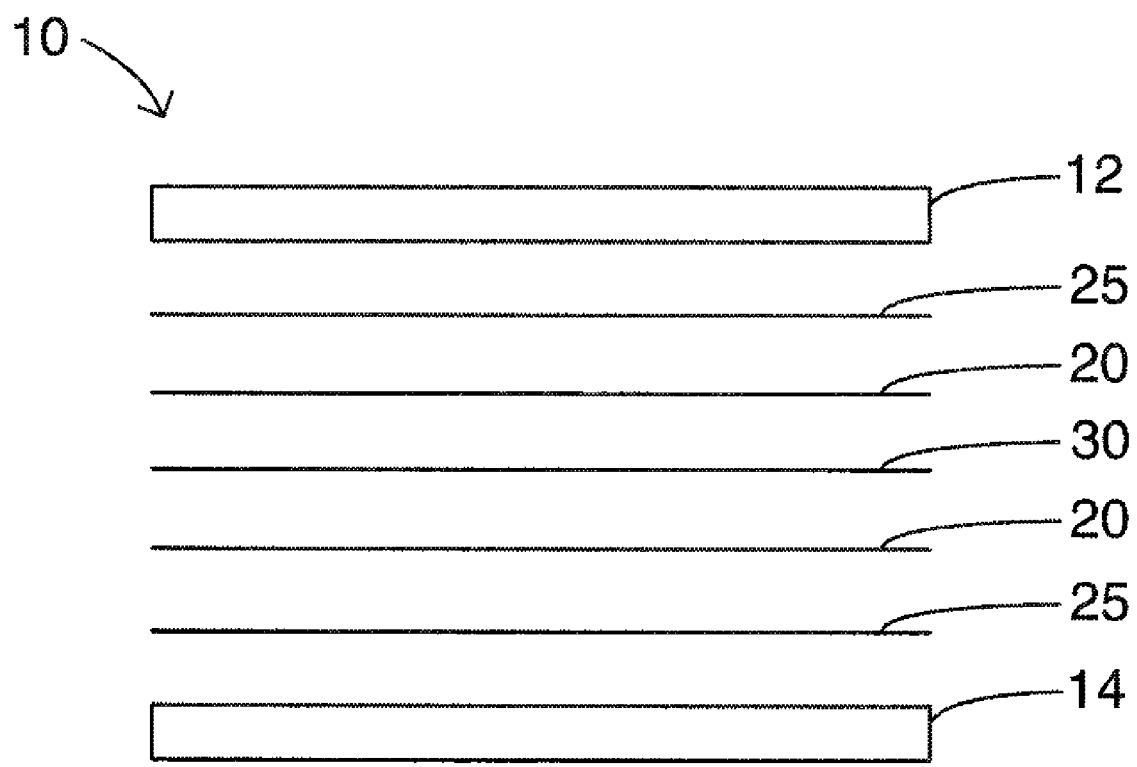
FIG. 1 is a schematic representation of the laminate being formed by one exemplary lamination process of the present invention.

As used herein, the term "fabric" includes plain weave fabrics constructed using convention weaving techniques.

The term "fiber" as used herein refers to a fundamental component used in the assembly of yarns and fabrics. Generally a fiber is a component which has a length dimension which is much greater than its diameter or width. This term includes monofilament, multi-filament, ribbon, strip, staple, and other forms of chopped, cut or discontinuous fiber and the like having a regular or irregular crossection. "Fiber" also includes a plurality of any one of the above or a combination of the above.

As used herein the term "high performance fiber" means that class of fibers having high values of tenacity (greater than 7 g/d) such that they lend themselves for applications where high abrasion and/or cut resistance is important. Typically, high performance fibers have a very high degree of molecular orientation and crystallinity in the final fiber structure.

As used herein the term "high performance fabric" means a fabric constructed using a high performance fiber as a major constituent of the fabric such that the fabric enjoys the performance benefits of the high performance fabric. Thus, a fabric constructed of 100% high performance fiber is a high performance fabric. Depending on the construction of the high performance fabric, however, a "major constituent" of high performance fiber may comprise less than a majority of the fiber in the fabric. As discussed in more detail below, a woven fabric in which at least about 50 percent of the warp yarns, or 50 percent of the fibers in the warp yarns, are comprised of a suitable high performance fiber meets this definition for the purposes of the present invention. The remaining warp yarns and the fill yarns may be comprised of any other suitable material that is compatible with the practice of the present invention.

The cross-sectional shapes of fibers suitable for the practice of the present invention include circular, flat or oblong. They may also be of irregular or regular multi-lobal cross-section having one or more regular or irregular lobes projecting from the linear or longitudinal axis of the filament.

As used herein the terms laminate and laminating refer to the application of a flexible film to a fabric construction to form a lasting bond that will hold up to rough usage without delamination.

Suitable high tenacity, high modulus fibers are solution-drawn, ultra-high molecular weight (UHWM) polyethylene fibers, such as those sold under the brand names Spectra®, Dyneema® and Tekmilon®. Further it is believed that melt spun polyethylene fibers with a tenacity of 15 grams per denier, such as Certran® fibers, can be laminated but may not provide the same film adhesion. Also, aramid fibers such as Kevlar® (DuPont) is believed to provide a suitable fiber for the base layer.

It has been found that polyethylene and ethylene vinyl acetate (EVA) films can be made to adhere to fabrics constructed from ultra high molecular weight polyethylene (UHMVPE) fibers without the use of a bonding agent under appropriate laminating conditions. Any suitable EVA film can be used as the film for lamination directly to the UHMWPE fabric. It has now been found that high-density polyethylene, low-density polyethylene and linear low-density polyethylene films will bond well onto EVA and are thus suitable for use as the outer layer(s) in the practice of the present invention. More specifically, in the examples that follow, EVA is used as the thermoplastic film/material that is laminated directly to the fabric since EVA has been found to have superior bonding with the fabric. A polyethylene film, which bonds quite well with EVA under certain laminating conditions, is used as the outer laminate layer since it can withstand higher operational temperatures without the degradation described above, and thus prevent a tacky surface as may be experienced by an EVA outer layer in some environments.

The following methods for forming the composite laminated fabric construction comprise the application of heat and/or pressure to the fabric and lamination films for a given time.

In a first aspect of the present invention, illustrated schematically in FIG. 1, the application of heat and pressure is accomplished by means of a flat hydraulic press 10. Positioned between the upper 12 and lower 14 press members are a fabric sheet 30 formed of ultra high molecular weight polyethylene yarns, a first lamination film 20 of EVA 20, and a second, or outer lamination film 25 of low or high density polyethylene. As shown in FIG. 1, both sides of the fabric sheet 30 are laminated with the two film layers; however, the two film layers may be laminated to only a single side of the fabric sheet 30 if desired. The press members 12, 14 clamp the fabric sheet 30, EVA film 20 and polyethylene film 25 under varying conditions of heat, pressure, and time. A suitable press for the practice of the present invention is the Wabash Model MPI V50H-18-BC. The practice of the present invention also includes the use as necessary of a suitable release paper between the outer polyethylene layer 25 and the hydraulic press platens to prevent heat damage to the fabric surface.

More particularly, the variable conditions for lamination with a hydraulic press of this type comprise: (1) the fabric construction, (2) thicknesses of the film layers 20, 25, (3) the pressure applied by the press members 12, 14, (4) the temperature applied by the press members, and (5) the time that the pressure and temperature are applied. The fabric used in the present invention is formed from high performance yarns having a denier between about 360 and about 1,200. The EVA film 20 has an initial thickness of between about 2 mils and about 8 mils, and desirably between 4 mils and 8 mils. The polyethylene film 25 has an initial thickness of between about 1.5 mils and 20 mils, and is desirably between about 1.5 and 2 mils. The desirable temperature range is between about 200 degrees Fahrenheit and 285 degrees Fahrenheit. Pressure is applied between about 50 psi and about 500 psi. Lastly, contact time is between about 5 minutes and about 15 minutes. Additional heating in an oven may further enhance the bonding between the EVA and the fabric, and between the EVA and the polyethylene.

Alternatively, the lamination process of the present invention may be performed by first rolling the fabric and film layers into a tight roll. The pressure applied to create the lamination of the layers results from the combination of first rolling the fabric, EVA film, and the polyethylene film into a tight roll with the fabric positioned exteriorly of the films, and by the pressure generated by shrinkage of the fabric fibers during heating. Temperatures for heating the roll in an oven may vary between about 200 degrees Fahrenheit and about 285 degrees Fahrenheit, depending on the type of polyethylene thermoplastic film used. Heating time varies from about 8 hours to about 18 hours depending upon the temperature selected. Thus, as the process temperature is increased, process time is reduced. Conversely, at lower process temperatures, the time required to create a usable film to fabric bond and film to film bond increases rapidly. The minimum acceptable temperature is that which is sufficient to soften the films and to create a sufficient laminating pressure.

Figure 2:
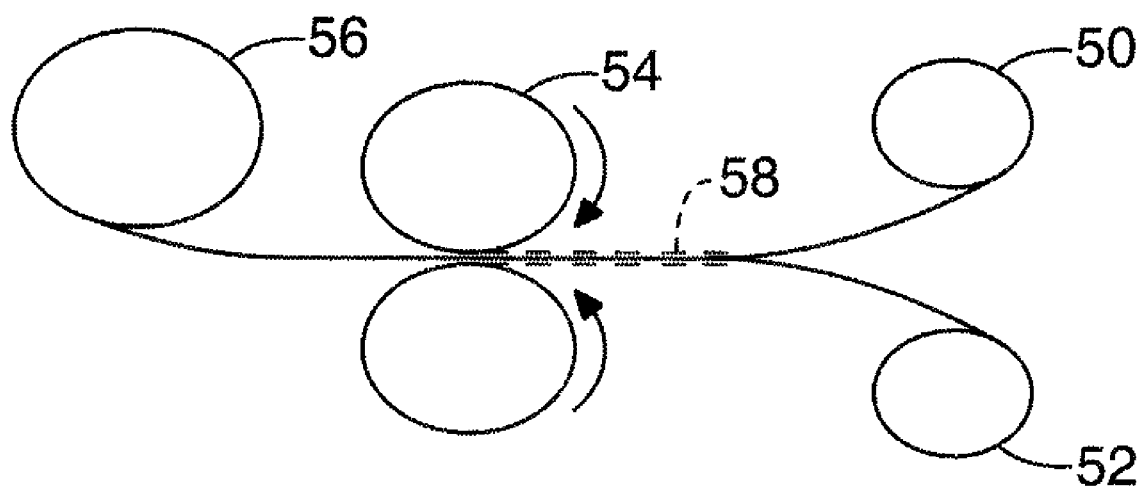
FIG. 2 is a schematic representation of the laminate being formed by a second exemplary lamination process of the present invention.
Figure 3:
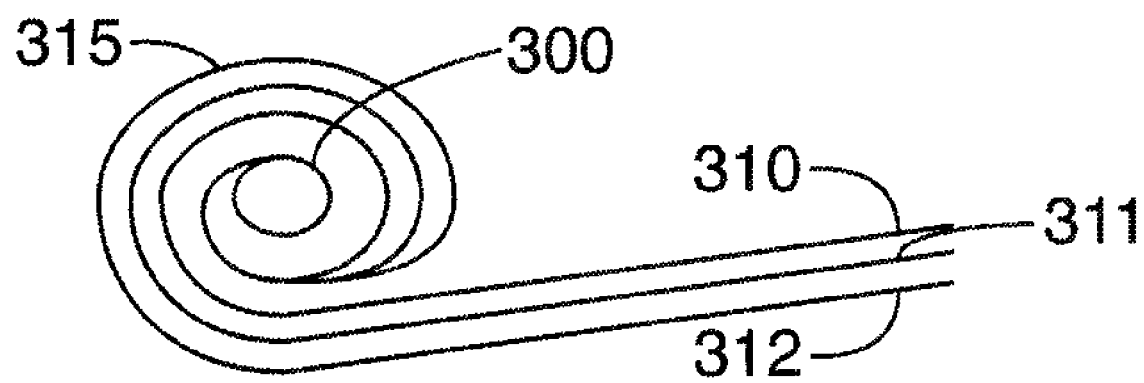
FIG. 3 is a more detailed schematic representation of the lamination process of FIG. 2.

This alternative lamination process may be conducted using a three-step process as illustrated in FIGS. 2 and 3. The first step includes first simultaneously tacking the thermoplastic polyethylene film 25 and the EVA film 20 to the fabric construction 52 on a continuous basis using a heated calendar roll 54 to form a lightly laminated three-ply construction. After this step, the polyethylene film 25, EVA film 20, and fabric 52 are uniformly adhered, but can be separated easily. In this condition the high performance fabric/EVA film/polyethylene film combination is not suitable for the proposed end uses contemplated for the present invention. A release paper 58 may be used if desired. A suitable machine is the Van Vlandrin Silk Calender with a husk soft roll and a heated steel center roll. Older versions of this machine are steam heated and have provision for modifying the amount of pressure applied to the film/fabric combination. After the tacking step, the continuous roll is wound tightly into a bundle 56 with appropriate release paper 58 and secured with heat resistant tape. In this example, the release paper 58 is positioned so as to be directly adjacent the paper core 300 during windup. Next, the bundle is baked in an oven for between about 8 hours and about 18 hours at a temperature between about 200 degrees Fahrenheit and about 285 degrees Fahrenheit. In this embodiment, pressure is applied to the film/fabric in one of two ways: (1) first at a moderate temperature and a relatively high pressure for a short duration, or (2) at a second much lower pressure for a much longer duration.

More particularly, as shown in the embodiment of FIG. 3, only one side of the fabric 312 is laminated. The fabric 312 and two film layers (20, 25), shown collectively as 311, are tightly rolled onto a paper core 300 having a diameter of between about 2 to 6 inches with a release paper 310 to form a bundle 315. The fabric 312 and film layers 311 are arranged so that the fabric 312 is positioned outwardly of the film. This is so that the force generated by the shrinkage of the fabric during heating will force the three component layers into laminating contact. Although reversing the position of the fabric and film may be acceptable, the better performance is achieved using the arrangement described above. The resulting bundle 315 is then secured with a tape capable of withstanding the laminating temperature. The wound bundle 315 is then heated to about between 200° F. and about 285° F. for a period of between about 8 hours and about 18 hours. Preferably, the heat treatment is conducted at a temperature of about 265° F. for about 18 hours. Here the primary laminating pressure is applied to the bundle by the fabric shrinkage that occurs during heating. The exact amount of pressure is unknown but is believed to be under 50 psi. Extra pressure beyond that generated by the act of forming the bundle may be applied during the heat treatment but is not required for acceptable results.

The laminates of the present invention may also be made using machines designed for other purposes. By way of non-limiting example, the apparatus disclosed in U.S. Pat. No. 5,401,344 to Dickson et al. for producing rolls of wrinkle free composite sheet material may be used. Dickson discloses a curing apparatus including a cylinder with an internally lined inflatable bladder. The cylinder is adaptable to be moved into surrounding relation with a sheet material. A forming roll is arranged to supply heat from the interior of the assembled wraps of material while the surrounding inflated bladder exerts pressure to cure a ballistics-type material over a predetermined cure cycle. The practice of the present invention does not involve a "curing" time per se. However, the ability to provide a controlled heating step and wrinkle-free final product are useful for the practice of the present invention. The content of the Dickson et al. patent is incorporated herein by reference in its entirety.

The following examples are exemplary of fabric, film, and lamination parameters that may be selected to practice the two methods of the present invention. The specific process parameters, i.e., temperature, pressure, time and materials illustrate the invention in an exemplary fashion and should not be construed as limiting the scope of the invention. In each of the examples, the fabric is constructed using 100% high performance fiber. The style designations used in the examples are well-known product references commonly used in the art.

EXAMPLE 1

A laminated fabric was produced by pressing a 17×17, plain weave fabric, style 902, woven from 1200 denier weight Spectra® 900 yarn with an EVA film and outer low density polyethylene film. The two films had a total thickness of about 8 mils. The three layers were subjected to a hydraulic press for five minutes at a temperature of 230 degrees Fahrenheit at 50 pounds per square inch.

EXAMPLE 2

A laminated fabric was produced by pressing a 34×34, plain weave fabric, style 904 woven from 650 denier weight Spectra® 900 yarn with an EVA film and outer low density polyethylene film. The two films had a total thickness of about 8 mils. The press temperature was 280 degrees Fahrenheit and the pressure was 150 PSI. The time under pressure and heat was five minutes.

EXAMPLE 3

A laminated fabric was produced by rolling together a 17×17 plain weave fabric, style 900, with an EVA film, an outer low density polyethylene film, and a 0.5 mil polyester release paper. The two films had a total thickness of about 8 mils. The tightly wound roll was wrapped with heat resistant tape and heated in an oven at 265 degrees Fahrenheit for 18 hours.

EXAMPLE 4

A laminated fabric was produced from a fabric formed from Spectra® yarns, style 904, woven from 650 denier weight Spectra® 900. EVA and low density polyethylene films having a combined thickness of 8 mils comprised the laminates. These components were wound tightly on a paper core along with a 0.5 mil Mylar® release film. The resulting roll was maintained under tension as it was secured with a suitable tape. The roll was heated at 275° F. for 18 hours. The film was uniformly laminated to the fabric.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What we claim is:

1. A puncture and abrasion resistant, air and fluid impervious laminated fabric, comprising:
    (a) a woven fabric base layer having warp and weft yarns, at least the warp yarns in the fabric base layer being formed of ultra high molecular weight polyethylene, and the warp yarns having a denier of between about 300 and about 1,200, the fabric base layer having first and second sides;
    (b) first thermoplastic ethylene vinyl acetate film bonded by heat and pressure to each of the first and second sides of the fabric base layer; and (c) second thermoplastic film bonded by heat and pressure to each of the first thermoplastic films, the second thermoplastic film selected from the group consisting of high density polyethylene, low density polyethylene, and linear low density polyethylene.

2. The laminated fabric of claim 1 wherein the first thermoplastic film of ethylene vinyl acetate has a thickness of between about 2 and 8 mils, and the second thermoplastic film has a thickness of between about 1.5 and 20 mils.

3. The laminated fabric of claim 1 wherein 100% of the yarns forming the base layer are formed of ultra high molecular weight polyethylene.

* * * * *